US 12,304,656 B2

(12) United States Patent
Shimomori (10) Patent No.: US 12,304,656 B2
(45) Date of Patent: May 20, 2025

(54) PASSENGER BOARDING BRIDGE MONITORING DEVICE

(71) Applicant: SHINMAYWA INDUSTRIES, LTD., Takarazuka (JP)

(72) Inventor: Wataru Shimomori, Takarazuka (JP)

(73) Assignee: SHINMAYWA INDUSTRIES, LTD., Takarazuka (JP)

( * ) Notice: Subject to any disclaimer, the term of this patent is extended or adjusted under 35 U.S.C. 154(b) by 692 days.

(21) Appl. No.: 17/754,735

(22) PCT Filed: Oct. 30, 2019

(86) PCT No.: PCT/JP2019/042580
§ 371 (c)(1),
(2) Date: Apr. 11, 2022

(87) PCT Pub. No.: WO2021/084651
PCT Pub. Date: May 6, 2021

(65) Prior Publication Data
US 2023/0271722 A1    Aug. 31, 2023

(51) Int. Cl.
*B64F 1/30* (2006.01)
*B64F 1/305* (2006.01)

(52) U.S. Cl.
CPC .................. *B64F 1/3055* (2013.01)

(58) Field of Classification Search
CPC ............... B64F 1/3055; B64F 1/002
See application file for complete search history.

(56) References Cited

U.S. PATENT DOCUMENTS

| 7,603,736 B2* | 10/2009 | Hutton | B64F 1/3055 14/71.5 |
| 2007/0214585 A1* | 9/2007 | Hutton | B64F 1/3055 14/73.5 |
| 2008/0109970 A1* | 5/2008 | Hutton | G01S 13/758 14/71.5 |
| 2008/0229525 A1* | 9/2008 | Hutton | B64F 1/002 14/71.5 |
| 2008/0231472 A1* | 9/2008 | Hutton | B64F 1/3055 340/958 |

FOREIGN PATENT DOCUMENTS

| JP | 2000355298 A | * 12/2000 | ............ B64F 1/3055 |
| JP | 4106155 B2 | 6/2008 | |
| WO | WO-2016147213 A1 | * 9/2016 | ............. B64F 1/305 |

* cited by examiner

*Primary Examiner* — Abigail A Risic
(74) *Attorney, Agent, or Firm* — Alleman Hall & Tuttle LLP (57) ABSTRACT

Provided is a passenger boarding bridge monitoring device, for passenger boarding bridges each including: a rotunda; a tunnel unit; a travel device; a cab; and detectors that detect a rotational angle of the rotunda and the cab and a length of the tunnel unit. The monitoring device calculates a current position of a virtual line based on detection values of the respective detectors of the one bridge, the virtual line being shifted outward from a profile of the one bridge and conforming to the profile; calculates a current position of a virtual line based on detection values of the respective detectors of the other bridge, the virtual line either extending along or being shifted outward from a profile of the other bridge; and determines whether or not the two virtual lines are in a state of crossing each other, and if so, performs a first coming-close hindering process.

4 Claims, 8 Drawing Sheets

PASSENGER BOARDING BRIDGE MONITORING DEVICE

TECHNICAL FIELD

The present invention relates to a passenger boarding bridge monitoring device for monitoring a plurality of passenger boarding bridges.

BACKGROUND ART

At an airport, a passenger boarding bridge that connects between a terminal building and an aircraft is used for boarding onto and disembarking from the aircraft. The passenger boarding bridge is a tunnel-shaped passage installed on a terminal building at an airport. The passenger boarding bridge is extendable, retractable, and rotatable. At the time of boarding onto and disembarking from an aircraft, a distal-end cab of the passenger boarding bridge is docked with a door of the aircraft, and passengers walk through an internal passage of the passenger boarding bridge to board onto or disembark from the aircraft.

In a case where a plurality of passenger boarding bridges are used for one aircraft, there is a risk of a collision between the passenger boarding bridges at the time of docking or undocking thereof. In light of this, conventionally, a collision prevention device for preventing a collision between passenger boarding bridges has been proposed (see Patent Literature 1, for example).

In Patent Literature 1, a distance between a predetermined corner of one passenger boarding bridge and a predetermined side of the other passenger boarding bridge and/or a distance between the predetermined corner of the one passenger boarding bridge and a predetermined corner of the other passenger boarding bridge is/are calculated, and such distances are calculated at multiple positions. In Patent Literature 1, a collision prevention operation is performed if any of these calculated distances becomes a predetermined value or less.

CITATION LIST

Patent Literature

PTL 1: Japanese Patent No. 4106155

SUMMARY OF INVENTION

Technical Problem

In the above-described configuration, distances between two passenger boarding bridges are calculated at multiple positions, and if any of the calculated distances becomes a predetermined value or less, it is determined that the two passenger boarding bridges have come close to each other, and the collision prevention operation is performed. In this case, a distance between a point (a corner) and a line (a side) and/or a distance between a point (a corner) and a point (a corner) is/are calculated. That is, each distance is calculated between two ends, and at least one of the two ends is a point (a corner). For this reason, depending on how these ends between which the distances are calculated are set and toward which positions the two passenger boarding bridges are moving, it is possible that the two passenger boarding bridges being in the state of coming close to each other cannot be detected.

The present invention has been made to solve the above-described problems. An object of the present invention is to provide a passenger boarding bridge monitoring device that is capable of assuredly detecting a state where passenger boarding bridges have come close to each other.

Solution to Problem

In order to achieve the above object, a passenger boarding bridge monitoring device according to one aspect of the present invention is a passenger boarding bridge monitoring device for, when docking and/or undocking a plurality of passenger boarding bridges with and/or from a plurality of respective entrances of an aircraft, monitoring the plurality of passenger boarding bridges. Each of the passenger boarding bridges includes: a rotunda connected to a terminal building and supported such that the rotunda is rotatable horizontally; a tunnel unit whose proximal end is connected to the rotunda, the tunnel unit being extendable and retractable; a travel device that supports the tunnel unit, the travel device including travel wheels that are drivable to rotate in regular and reverse directions; a rotatable cab provided at a distal end of the tunnel unit and mounted to one of the entrances of the aircraft; a detector that detects a rotational angle of the rotunda; a detector that detects a length of the tunnel unit; and a detector that detects a rotational angle of the cab. The passenger boarding bridge monitoring device includes: a line calculator configured to calculate, for one of the passenger boarding bridges that are adjacent to each other, a current position of a virtual line based on detection values of the respective detectors of the one passenger boarding bridge, the virtual line being set such that, in a plan view, the virtual line is shifted outward from a profile of the one passenger boarding bridge of its side adjacent to the other passenger boarding bridge, and is a line having a shape conforming to a shape of the profile, the line calculator being configured to calculate, for the other passenger boarding bridge, a current position of a virtual line based on detection values of the respective detectors of the other passenger boarding bridge, the virtual line being set such that, in a plan view, the virtual line either extends along or is shifted outward from a profile of the other passenger boarding bridge of its side adjacent to the one passenger boarding bridge, and is a line having a shape confirming to a shape of the profile: and a monitoring controller configured to determine based on a predetermined crossing determination condition whether or not the virtual line, of the one passenger boarding bridge, whose current position is calculated by the line calculator and the virtual line, of the other passenger boarding bridge, whose current position is calculated by the line calculator are in a state of crossing each other, and if it is determined that the virtual lines are in the state of crossing each other, perform a first coming-close hindering process.

According to the above configuration, it is determined whether or not the virtual line of the one passenger boarding bridge and the virtual line of the other passenger boarding bridge are in the state of crossing each other. If it is determined that the virtual lines are in the state of crossing each other, the first coming-close hindering process is performed. In this manner, the state of the virtual lines of the adjacent passenger boarding bridges relative to each other is determined, which makes it possible to assuredly detect a state where the passenger boarding bridges have come close to each other.

The monitoring controller may be configured to determine based on a predetermined closeness determination condition whether or not the virtual line, of the one passenger boarding bridge, whose current position is calculated by the line calculator and the virtual line, of the other passenger boarding bridge, whose current position is calculated by the line calculator are in a state of being close to each other, and if it is determined that the virtual lines are in the state of being close to each other, perform a second coming-close hindering process.

According to the above configuration, whether or not the virtual lines of the adjacent passenger boarding bridges are in the state of being close to each other is determined, which makes it possible to assuredly detect a state where the passenger boarding bridges have come close to each other. It should be noted that in a case where the virtual lines of the adjacent passenger boarding bridges are in the state of being close to each other, the passenger boarding bridges are more distant from each other than in a case where the virtual lines of the adjacent passenger boarding bridges are in the state of crossing each other.

Each of the passenger boarding bridges may include a display device. The passenger boarding bridge monitoring device may further include a display data generator configured to generate display data for displaying, on the display device, the virtual lines whose current positions are calculated by the line calculator.

According to the above configuration, for example, operators can operate the respective passenger boarding bridges while checking the distance between these adjacent passenger boarding bridges by looking at the virtual lines of the respective passenger boarding bridges, which are displayed on the display device of each passenger boarding bridge. This makes it possible to prevent the passenger boarding bridges from coming abnormally close to each other.

The line calculator may be configured to calculate the current position of the virtual line of the one passenger boarding bridge and the current position of the virtual line of the other passenger boarding bridge by using coordinates of a single orthogonal coordinate system in which a predetermined position is set as an origin.

Advantageous Effects of Invention

The present invention is configured as described above, and has an advantage of being able to provide a passenger boarding bridge monitoring device that is capable of assuredly detecting a state where the passenger boarding bridges have come close to each other.

The above object, other objects, features, and advantages of the present invention will be made clear by the following detailed description of a preferred embodiment with reference to the accompanying drawings.

DESCRIPTION OF EMBODIMENTS

Hereinafter, a preferred embodiment of the present invention is described with reference to the drawings. In the drawings, the same or corresponding elements are denoted by the same reference signs, and repeating the same descriptions is avoided below. The present invention is not limited to the embodiment described below.

Embodiment

Figure 1:
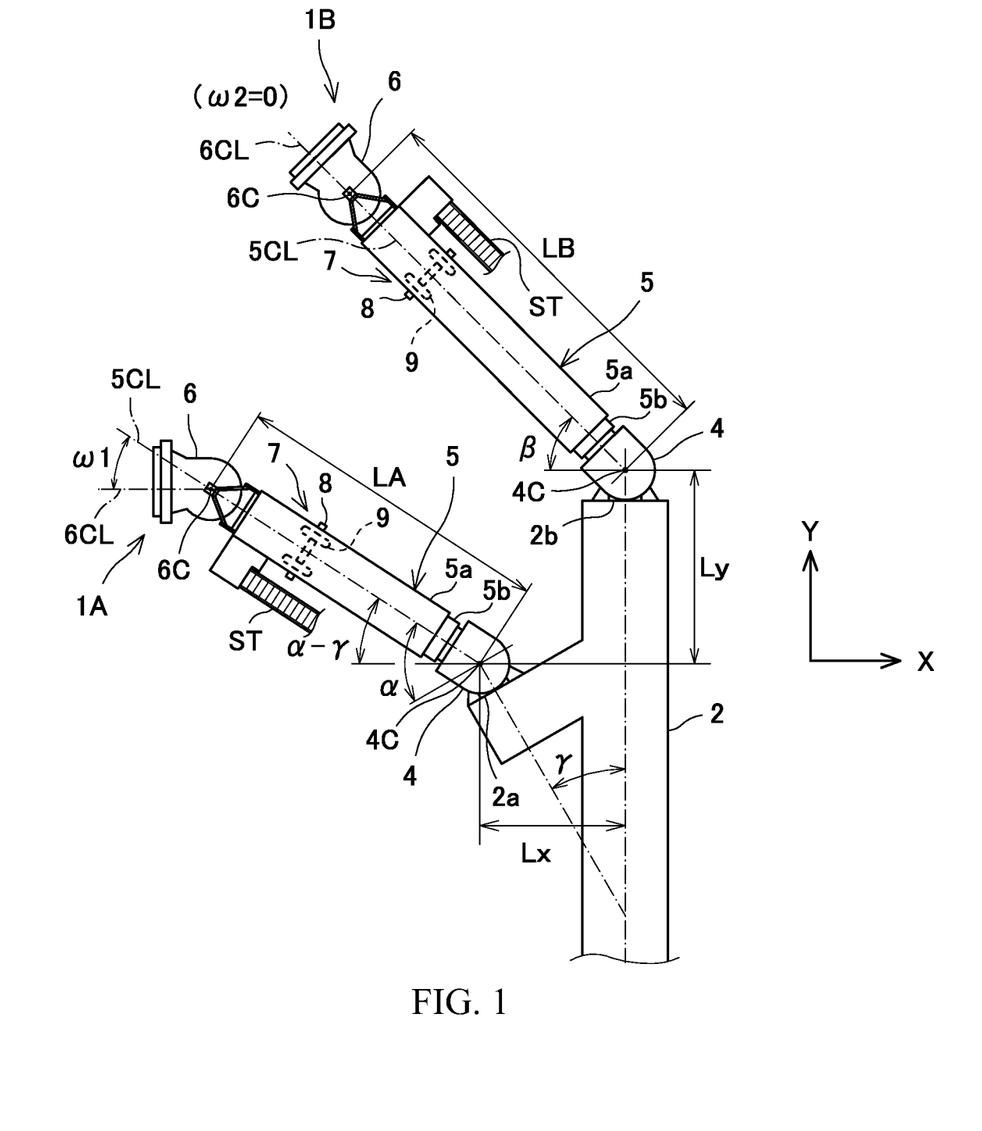
FIG. 1 is a schematic plan view showing one example of two passenger boarding bridges that are monitored by a passenger boarding bridge monitoring device according to an embodiment of the present invention.
Figure 2:
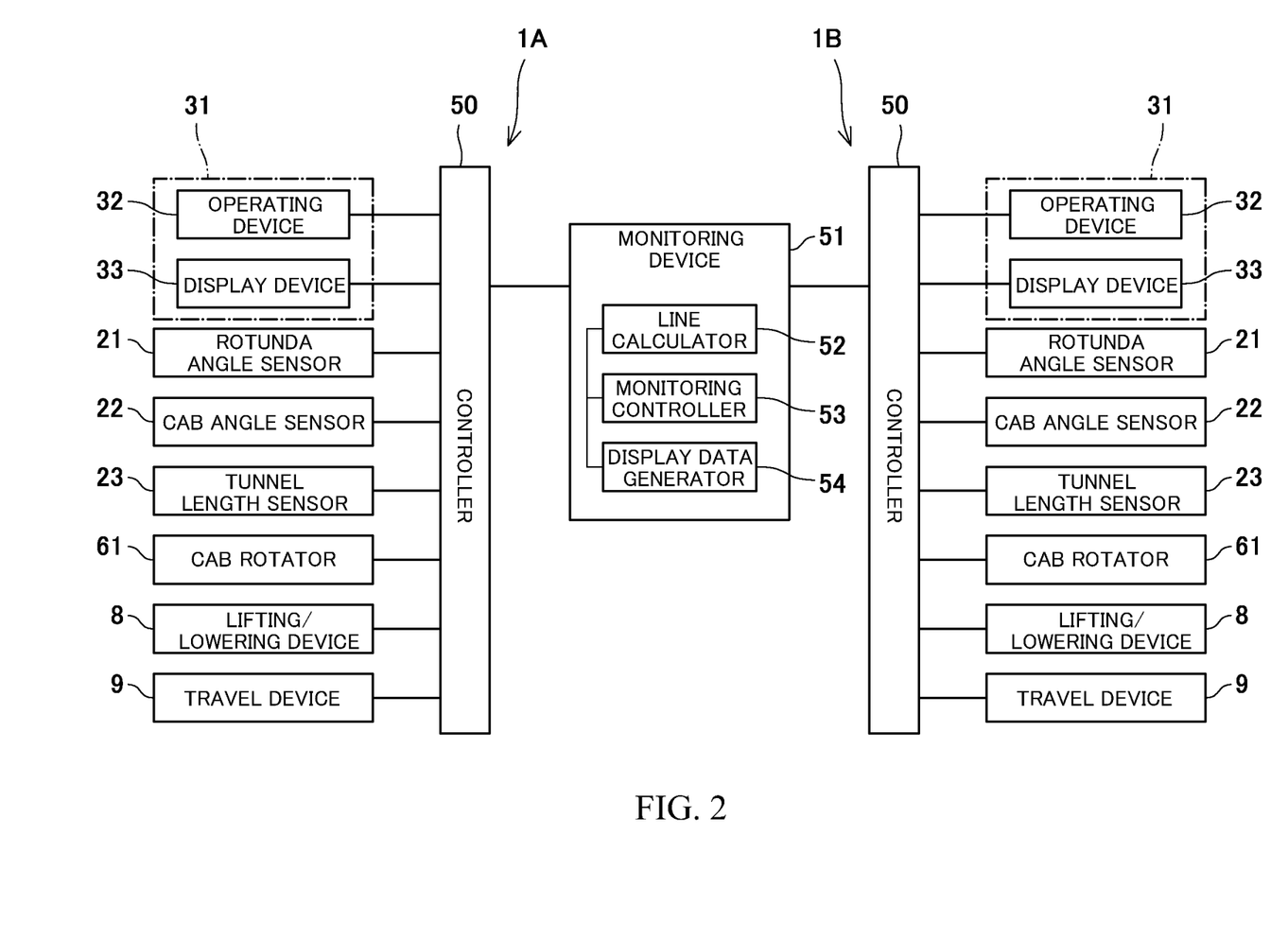
FIG. 2 is a block diagram showing one example of the passenger boarding bridge monitoring device and the two passenger boarding bridges according to the embodiment.

FIG. 1 is a schematic plan view showing one example of two passenger boarding bridges that are monitored by a passenger boarding bridge monitoring device according to the present embodiment. FIG. 2 is a block diagram showing one example of the monitoring device and the two passenger boarding bridges.

Two passenger boarding bridges 1A and 1B shown in FIG. 1 are to be docked with two respective entrances (doors) of an aircraft. It should be noted that the two passenger boarding bridges 1A and 1B have fundamentally the same configuration. In the description herein, components of the passenger boarding bridge 1A and components of the passenger boarding bridge 1B corresponding thereto are denoted by the same reference signs.

In the following description of FIG. 1, for the sake of convenience of the description, the direction in which the overall length of a tunnel unit 5 of each of the passenger boarding bridges 1A and 1B is extended and retracted is referred to as a front-back direction; the direction in which the gravitational force is exerted on each of the passenger boarding bridges 1A and 1B is referred to as a vertical direction; and the width direction of each of the passenger boarding bridges 1A and 1B (i.e., the direction orthogonal to the front-back direction and the vertical direction) is referred to as a left-right direction.

A rotunda (rear round room) 4 of one passenger boarding bridge 1A is connected to one entrance 2a of a terminal building 2, and a rotunda 4 of the other passenger boarding bridge 1B is connected to the other entrance 2b of the terminal building 2.

Each of the passenger boarding bridges 1A and 1B includes: the rotunda 4 supported by a support pillar such that the rotunda 4 is rotatable about a vertical axis (rotational axis) in regular and reverse directions; the tunnel unit 5 whose proximal end is connected to the rotunda 4, the tunnel unit 5 being swingable vertically such that the distal end of the tunnel unit 5 is liftable and lowerable; a cab (a front round room) 6 rotatably provided at the distal end of the tunnel unit 5; drive columns 7, which support the tunnel unit 5 at the distal side of the tunnel unit 5; and auxiliary stairs ST.

The tunnel unit 5 forms a passenger walkway, and includes a plurality of tubular tunnels 5a and 5b, which are fitted together in a telescopic manner (nested manner), such that the tunnel unit 5 is extendable and retractable in the longitudinal direction. In the description herein, the tunnel unit 5 is formed by the two tunnels 5a and 5b as one example. The tunnel unit 5 is formed by two or more tunnels.

The distal side of the tunnel unit 5 (specifically, the tunnel 5a, which is the frontmost tunnel) is provided with the drive columns 7, which serve as support legs. The drive columns 7 are provided with a lifting/lowering device 8, which moves the tunnel unit 5 upward and downward (i.e., lifts and lowers the tunnel unit 5). By moving the tunnel unit 5 upward/downward by the lifting/lowering device 8, the cab 6 and the tunnel unit 5 can be swung vertically with respect to the rotunda 4.

The drive columns 7 are further provided with a travel device 9 including a pair of travel wheels, which are drivable to rotate independently of each other. The travel device 9 is provided below the lifting/lowering device 8. The travel device 9 is configured to travel forward and backward by the rotation of the two travel wheels, and the travel direction of the travel device 9 is changeable. By causing the travel wheels of the travel device 9 to travel on the ground of an apron, the tunnel unit 5 can be rotated about the rotunda 4, and the tunnel unit 5 can be extended/retracted. It should be noted that the drive columns 7 may be provided not on the tunnel 5a but on the cab 6.

The cab 6 is provided at the distal end of the tunnel unit 5. The cab 6 is configured to be rotatable, by means of an unshown rotational mechanism (a cab rotator 61 shown in FIG. 2), in regular and reverse directions about a rotational axis that is perpendicular to the floor surface of the cab 6.

Further, as shown in FIG. 2, a control board 31 including an operating device 32 and a display device 33 is installed in the cab 6. The operating device 32 includes various operation switches and an operating lever. An operator can operate the passenger boarding bridge 1A or 1B by using the various operation switches and the operating lever.

Each of the passenger boarding bridges 1A and 1B includes: a rotunda angle sensor (a rotunda rotational angle detector) 21, which detects a rotational angle α or β of the rotunda 4; a cab angle sensor (a cab rotational angle detector) 22, which detects a rotational angle ω1 or ω2 of the cab 6; and a tunnel length sensor (a tunnel length detector) 23, which detects a distance LA or LB (see FIG. 1) from a rotational center point 4C of the rotunda 4 to a rotational center point 6C of the cab 6. These sensors are arranged at suitable positions, respectively. The tunnel length sensor 23 is configured as, for example, a distance meter that measures the length of the tunnel unit 5. The tunnel length sensor 23 is capable of calculating, based on its measurement value, the distance LA or LB, which is the distance between the rotunda center point and the cab center point (hereinafter, referred to as "rotunda center-to-cab center distance").

It should be noted that, in the present embodiment, as shown in FIG. 1, the rotational angle α of one rotunda 4 is an angle that a center line 5CL of one tunnel unit 5 forms clockwise with respect to a parallel line parallel to an end face of the entrance 2a, to which the one rotunda 4 is connected, and the rotational angle β of the other rotunda 4 is an angle that a center line 5CL of the other tunnel unit 5 forms clockwise with respect to a parallel line parallel to an end face of the entrance 2b, to which the other rotunda 4 is connected. The rotational angle ω1 of one cab 6 is an angle that a center line 6CL of the one cab 6 forms with respect to the center line 5CL of the one tunnel unit 5, and the rotational angle ω2 of the other cab 6 is an angle that a center line 6CL of the other cab 6 forms with respect to the center line 5CL of the other tunnel unit 5. In the description herein, in a case where the center line 6CL of the cab 6 coincides with the center line 5CL of the tunnel unit 5, the rotational angle of the cab 6 is 0° (e.g., ω2=0); in a case where the center line 6CL of the cab 6 is shifted to the left with respect to the center line 5CL of the tunnel unit 5, the rotational angle of the cab 6 is a negative value (for example, the illustrated rotational angle ω1 is a negative value; whereas in a case where the center line 6CL of the cab 6 is shifted to the right with respect to the center line 5CL of the tunnel unit 5, the rotational angle of the cab 6 is a positive value. Each cab 6 is, for example, configured to be rotatable in regular and reverse directions, such that its rotational angle ω1 or ω2 varies over the range of −90° to +30°.

A controller 50 is configured to: receive inputs of information (operation information) that is based on operations performed on the operating device 32; receive inputs of, for example, output signals from the sensors 21 to 23; and output, for example, information to be displayed on the display device 33. The controller 50 controls the cab rotator 61, the lifting/lowering device 8, the travel device 9, and so forth based on operations performed on the operating device 32. For example, each cab 6 or each frontmost tunnel 5a is provided with the controller 50.

A monitoring device 51 is one example of the passenger boarding bridge monitoring device according to the present embodiment. The monitoring device 51 is configured as a computer, for example. The monitoring device 51 is configured to be communicable with the controllers 50 of both the passenger boarding bridges 1A and 1B. The monitoring device 51 receives, from both the controllers 50 at every predetermined period, the rotational angles α and β of the respective rotundas 4, the rotational angles ω1 and ω2 of the respective cabs 6, and the rotunda center-to-cab center distances LA and LB of the respective passenger boarding bridges 1A and 1B. Based on these, the monitoring device 51 calculates a below-described virtual line and so forth (functions of a line calculator 52). It should be noted that, other than the values (α, β, ω1, ω2, LA, and LB) that change in accordance with operations of the passenger boarding bridges 1A and 1B, all the necessary information for calculating the virtual line and so forth are prestored in an internal storage (not shown) of the monitoring device 51.

The monitoring device 51 uses, for example, a single XY orthogonal coordinate system as shown in FIG. 1 (hereinafter, "XY coordinate system") to represent position coordinates in relation to the passenger boarding bridges 1A and 1B. In the description herein, the rotational center point 4C of the rotunda 4 of the one passenger boarding bridge 1A is used as an origin (0, 0), for which an X-axis and a Y-axis are set. Accordingly, the position coordinates of the rotational center point 4C of the rotunda 4 of the other passenger boarding bridge 1B are represented as (Lx, Ly) by using a predetermined amount of deviation Lx from the rotational center point 4C of the rotunda 4 of the one passenger boarding bridge 1A in the X-axis direction and a predetermined amount of deviation Ly from the rotational center point 4C of the rotunda 4 of the one passenger boarding bridge 1A in the Y-axis direction. Also, a predetermined angle γ is a positioning angle between the rotunda 4 of the one passenger boarding bridge 1A connected to the one entrance 2a of the terminal building 2 and the rotunda 4 of the other passenger boarding bridge 1B connected to the other entrance 2b. It should be noted that the XY coordinate system is not limited to the above example, but may be any orthogonal coordinate system in which a predetermined position is used as an origin.

Next, functions of the line calculator 52 of the monitoring device 51 are described with reference to FIG. 3 to FIG. 5.

Figure 3:
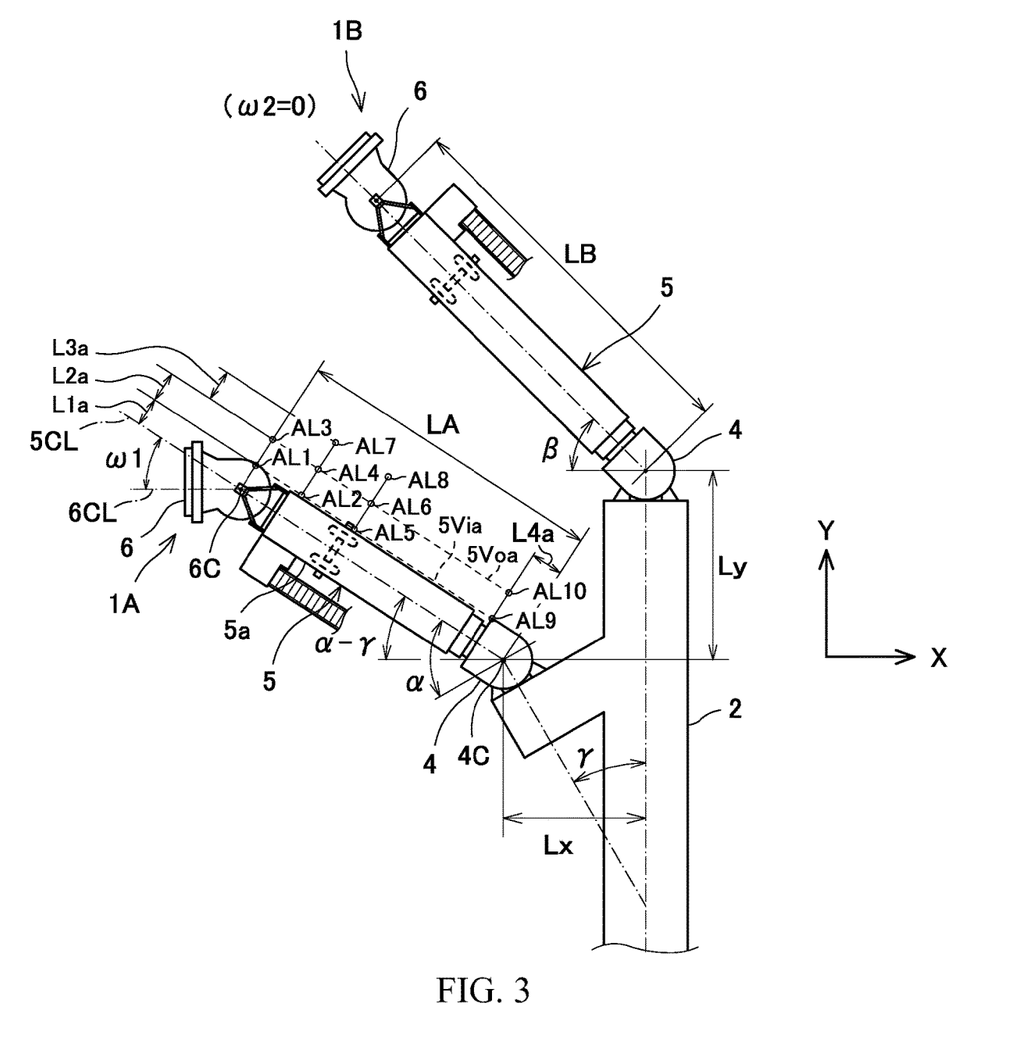
FIG. 3 shows one example of a method of setting a virtual line and so forth near a tunnel unit of one passenger boarding bridge.

FIG. 3 shows one example of a method of setting a virtual line and so forth near the tunnel unit 5 of the one passenger boarding bridge 1A.

The line calculator 52 calculates the position coordinates of points AL1 to AL10 in the XY coordinate system for the passenger boarding bridge 1A. The points AL1 to AL10 are points (virtual points) indicating positions that are preset for the passenger boarding bridge 1A. Specifically, for example, the points AL1 to AL10 can be preset in a manner described below.

A line segment that connects between the point AL1 and the point AL9 is a partial profile line 5Via. In a plan view, the partial profile line 5Via extends substantially along the profile of the passenger boarding bridge 1A of its side adjacent to the passenger boarding bridge 1B.

The point AL1 is, for example, a point indicating a position that is away from the center of the cab 6 by a predetermined distance L1*a* in the width direction (short-side direction) of the tunnel unit 5.

The point AL9 is, for example, a point indicating a position that is away from the center of the distal end of the rotunda 4, to which the tunnel unit 5 is connected, by the predetermined distance L1*a* in the width direction of the tunnel unit 5. In this case, the distance from the center of the distal end of the rotunda 4 to the rotational center point 4C of the rotunda 4 is a predetermined distance L4*a*.

Then, points indicating positions that are shifted outward from the point AL1 and the point AL9 in the width direction of the tunnel unit 5 by a predetermined distance L2*a* are defined as the point AL3 and the point AL10, respectively. A line segment that connects between the point AL3 and the point AL10 is a virtual line 5Voa, which is a line shifted outward by the predetermined distance L2*a* from the profile line 5Via, which connects between the point AL1 and the point AL9.

Figure 8:
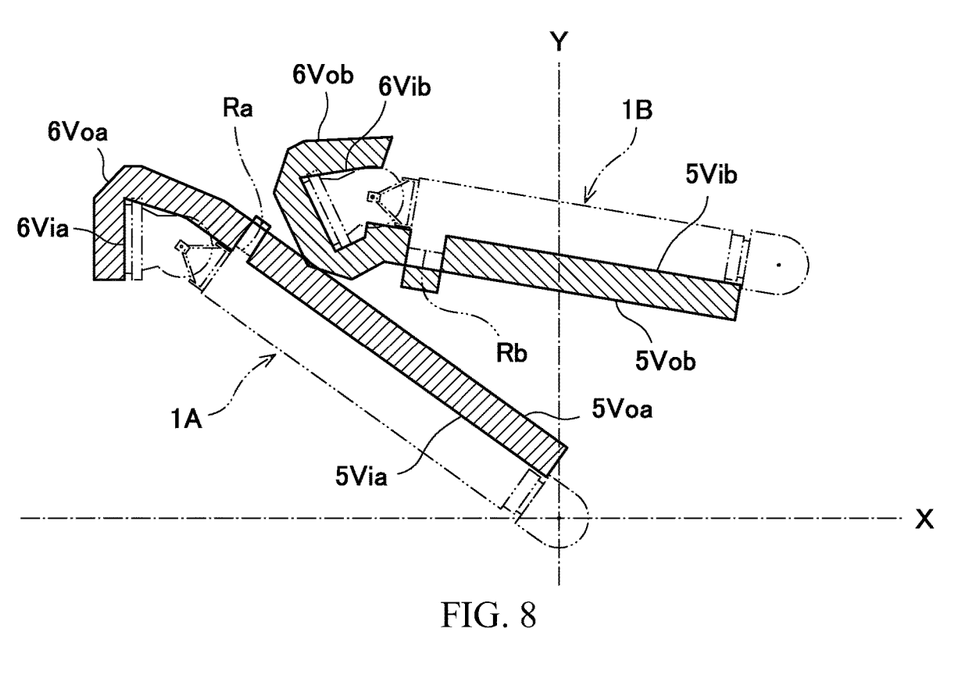
FIG. 8 shows one example of information about virtual lines and so forth, the information being displayed on a screen of a display device.

Assume a case where the frontmost tunnel 5*a* of the passenger boarding bridge 1A is provided with a protruding portion protruding toward the passenger boarding bridge 1B (e.g., an air conditioner outdoor unit; see a protruding portion Ra shown in FIG. 8). In this case, the points AL2 and AL4 to AL8 are points that are set in accordance with the position of the protruding portion. In this case, in accordance with both end positions of the protruding portion in the longitudinal direction of the tunnel, the point AL2 and the point AL5 are set on the line that connects between the point AL1 and the point AL9. The point AL4 and the point AL6 indicate positions that are shifted outward from the point AL2 and the point AL5, respectively, in the width direction of the tunnel unit 5 by the predetermined distance L2*a*, and are set on the line that connects between the point AL3 and the point AL10. In this case, a line that connects the points AL1, AL2, AL4, AL6, AL5, and AL9 in this order is the profile line 5Via. Then, points indicating positions that are shifted outward from the point AL4 and the point AL6, respectively, in the width direction of the tunnel unit 5 by a predetermined distance L3*a* are defined as the point AL7 and the point AL8, respectively. The predetermined distance L3*a* is set in accordance with a protrusion amount by which the protruding portion protrudes toward the passenger boarding bridge 1B. In this case, a line that connects the points AL3, AL4, AL7, AL8, AL6, and AL10 in this order is the virtual line 5Voa. In this case, the virtual line 5Voa is formed by the following line segments: a line segment whose end points are the points AL3 and AL4; a line segment whose end points are the points AL4 and AL7; a line segment whose end points are the points AL7 and AL8; a line segment whose end points are the points AL8 and AL6; and a line segment whose end points are the points AL6 and AL10.

Figure 4:
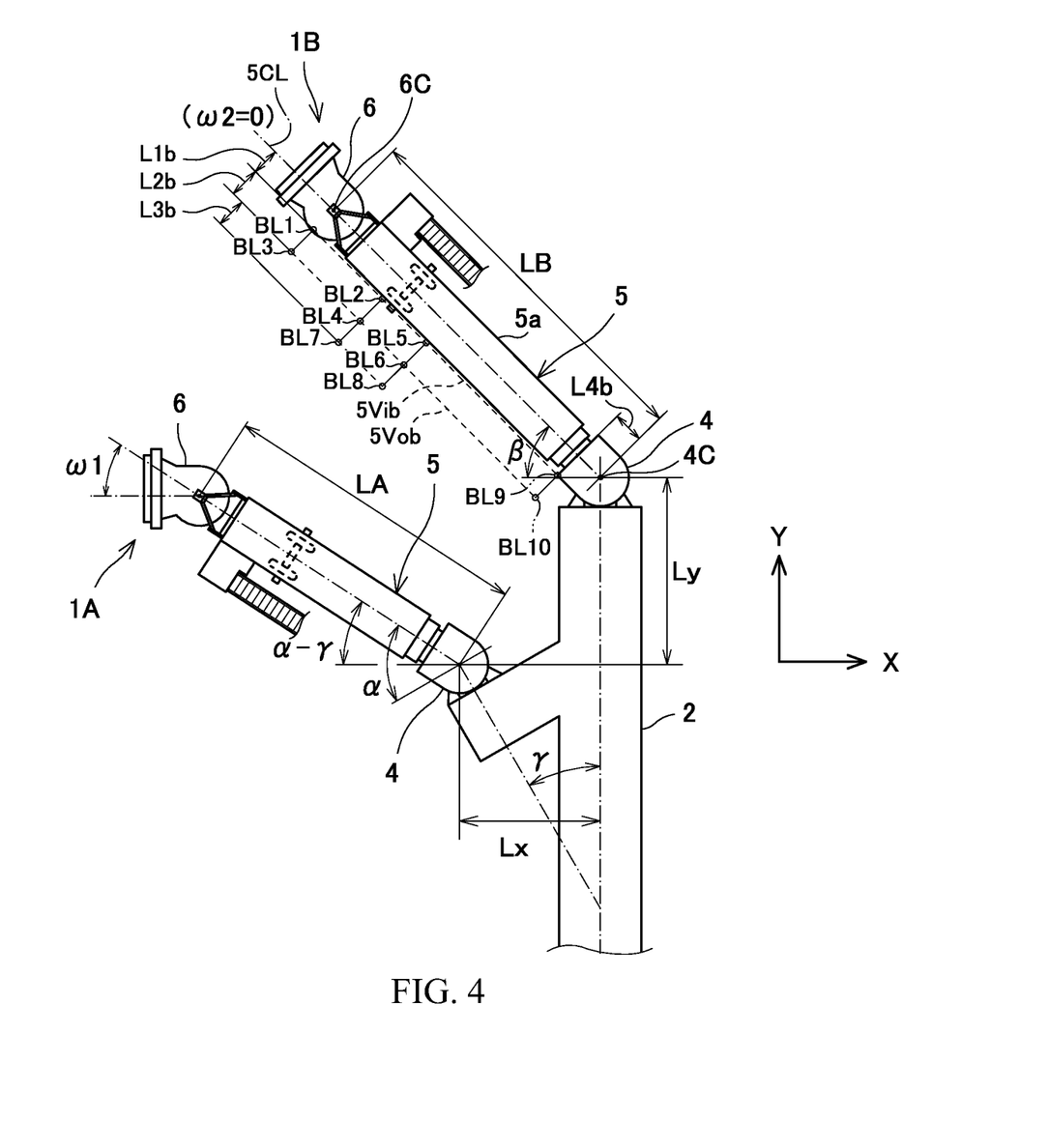
FIG. 4 shows one example of a method of setting a virtual line and so forth near a tunnel unit of the other passenger boarding bridge.

FIG. 4 shows one example of a method of setting a virtual line and so forth near the tunnel unit 5 of the other passenger boarding bridge 1B.

The line calculator 52 calculates the position coordinates of points BL1 to BL10 in the XY coordinate system for the passenger boarding bridge 1B. The points BL1 to BL10 are points (virtual points) indicating positions that are preset for the passenger boarding bridge 1B. The points BL1 to BL10 are points on the left side of the center line 5CL of the tunnel unit 5 of the passenger boarding bridge 1B, whereas the points AL1 to AL10 are points on the right side of the center line 5CL of the tunnel unit 5 of the passenger boarding bridge 1A. Although there is such a difference between the points AL1 to AL10 and the points BL1 to BL10, except this difference, the points BL1 to BL10 can be set for the passenger boarding bridge 1B in the same manner as the points AL1 to AL10, which are set for the passenger boarding bridge 1A. Predetermined distances L1*b*, L2*b*, L3*b*, and L4*b* of FIG. 4 correspond to the distances L1*a*, L2*a*, L3*a*, and L4*a* of FIG. 3, respectively.

Accordingly, a line segment connecting between the point BL1 and the point BL9 is a partial profile line 5Vib. In a plan view, the partial profile line 5Vib extends substantially along the profile of the passenger boarding bridge 1B of its side adjacent to the passenger boarding bridge 1A. Points indicating positions that are shifted outward from the point BL1 and the point BL9 in the width direction of the tunnel unit 5 by the predetermined distance L2*b* are defined as the point BL3 and the point BL10, respectively. A line segment connecting between the point BL3 and the point BL10 is a virtual line 5Vob.

Similar to the case of the points AL2 and AL4 to AL8 of FIG. 3, assuming that the frontmost tunnel 5*a* of the passenger boarding bridge 1B is provided with a protruding portion protruding toward the passenger boarding bridge 1A (e.g., an air conditioner outdoor unit; see a protruding portion Rb shown in FIG. 8), then the points BL2 and BL4 to BL8 are points that are preset in accordance with the position of the protruding portion. In this case, a line that connects the points BL1, BL2, BL4, BL6, BL5, and BL9 in this order is the profile line 5Vib, and a line that connects the points BL3, BL4, BL7, BL8, BL6, and BL10 in this order is the virtual line 5Vob. In this case, the virtual line 5Vob is formed by the following line segments: a line segment whose end points are the points BL3 and BL4; a line segment whose end points are the points BL4 and BL7; a line segment whose end points are the points BL7 and BL8; a line segment whose end points are the points BL8 and BL6; and a line segment whose end points are the points BL6 and BL10.

Figure 5:
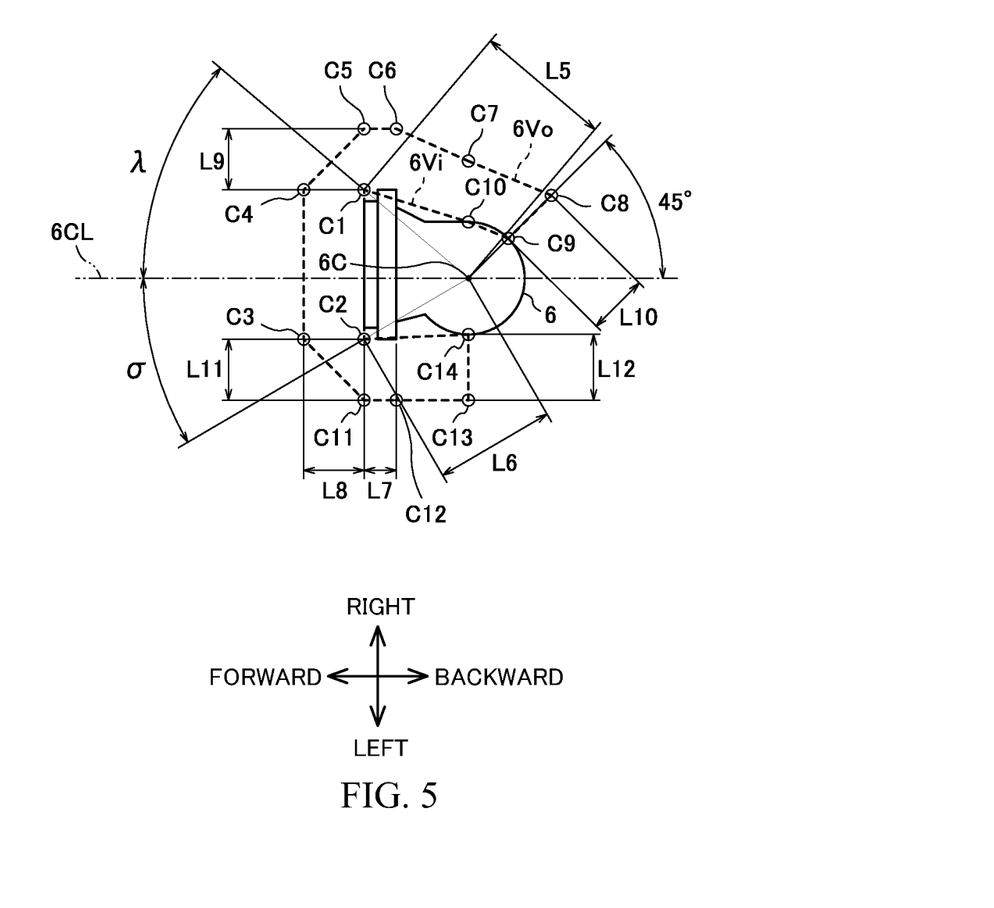
FIG. 5 shows one example of a method of setting a virtual line and so forth around a cab of each of the passenger boarding bridges.

FIG. 5 shows one example of a method of setting a virtual line and so forth around the cab 6 of each of the passenger boarding bridges 1A and 1B. Forward, backward, left, and right directions mentioned in the description hereinafter correspond to the forward, backward, left, and right directions illustrated in FIG. 5.

The line calculator 52 calculates the position coordinates of points C1 to C10 in the XY coordinate system for each of the passenger boarding bridges 1A and 1B. In this example, the position coordinates of points C11 to C14 in the XY coordinate system are calculated only for the passenger boarding bridge 1B. However, as an alternative, the position coordinates of the points C11 to C14 in the XY coordinate system may be calculated also for the passenger boarding bridge 1A in the same manner. In such a case, a profile line 6Vi and a virtual line 6Vo are set for each of the two passenger boarding bridges 1A and 1B in the same manner.

In the case of the cab 6 of the passenger boarding bridge 1B, a line that connects the points C9, C10, C1, C2, and C14 in this order is the profile line 6Vi, which extends substantially along the profile of the cab 6 (hereinafter, "6Vi" for the passenger boarding bridge 1B is referred to as "6Vib"). Accordingly, the profile line 6Vib is formed by the following line segments: a line segment whose end points are the points C9 and C10; a line segment whose end points are the points C10 and C1; a line segment whose end points are the points C1 and C2; and a line segment whose end points are the points C2 and C14.

In the case of the cab 6 of the passenger boarding bridge 1B, a line that connects the points C8, C7, C6, C5, C4, C3, C11, C12, and C13 in this order is the virtual line 6Vo, which is shifted outward from the profile line 6Vib (hereinafter, "6Vo" for the passenger boarding bridge 1B is referred to as "6Vob"). Accordingly, the virtual line 6Vob is formed by the following line segments: a line segment whose end points are the points C8 and C7; a line segment whose end points are the points C7 and C6; a line segment whose end points are the points C6 and C5; a line segment whose end points are the points C5 and C4; a line segment whose end points are the points C4 and C3; a line segment whose end points are the points C3 and C11; a line segment whose end points are the points C11 and C12; and a line segment whose end points are the points C12 and C13.

In the case of the cab 6 of the passenger boarding bridge 1A, a line that connects the points C9, C10, C1, and C2 in this order is the profile line 6Vi (hereinafter, "6Vi" for the passenger boarding bridge 1A is referred to as "6Via"). Accordingly, the profile line 6Via is formed by the following line segments: a line segment whose end points are the points C9 and C10; a line segment whose end points are the points C10 and C1; and a line segment whose end points are the points C1 and C2.

In the case of the cab 6 of the passenger boarding bridge 1A, a line that connects the points C8, C7, C6, C5, C4, and C3 in this order is the outward virtual line 6Vo (hereinafter, "6Vo" for the passenger boarding bridge 1A is referred to as "6Voa"). Accordingly, the virtual line 6Voa is formed by the following line segments: a line segment whose end points are the points C8 and C7; a line segment whose end points are the points C7 and C6; a line segment whose end points are the points C6 and C5; a line segment whose end points are the points C5 and C4; and a line segment whose end points are the points C4 and C3.

The points C1 to C14 are points (virtual points) indicating positions that are preset for each cab 6. Specifically, for example, the points C1 to C14 can be preset in a manner described below.

The point C1 is, for example, a virtual point near the right end of the distal side of the cab 6. The point C1 is on a line that extends diagonally forward right from the rotational center point 6C of the cab 6, the line forming a predetermined angle $\lambda$ with respect to the center line 6CL of the cab 6. The point C1 indicates a position that is away from the rotational center point 6C of the cab 6 by a predetermined distance L5.

The point C2 is, for example, a virtual point near the left end of the distal side of the cab 6. The point C2 is on a line that extends diagonally forward left from the rotational center point 6C of the cab 6, the line forming a predetermined angle $\sigma$ with respect to the center line 6CL of the cab 6. The point C2 indicates a position that is away from the rotational center point 6C of the cab 6 by a predetermined distance L6.

The point C3 indicates a position that is shifted forward from the point C2 by a predetermined distance L8. The point C4 indicates a position that is shifted forward from the point C1 by the predetermined distance L8.

The point C5 indicates a position that is shifted to the right from the point C1 by a predetermined distance L9. The point C6 indicates a position that is shifted backward from the point C5 by a predetermined distance L7.

The point C10 is, for example, set as a point near the right side surface of the cab 6. The point C10 indicates a position that is shifted to the right from the rotational center point 6C of the cab 6 by a predetermined distance L13 (not shown). The point C7 indicates a position that is shifted to the right from the point C10 by the predetermined distance L9.

The point C9 is, for example, set as a point near the back right side surface of the cab 6. The point C9 is on a line that extends diagonally backward right from the rotational center point 6C of the cab 6, the line forming a predetermined angle (in this example, 45°) with respect to the center line 6CL of the cab 6. The point C9 indicates a position that is away from the rotational center point 6C of the cab 6 by the predetermined distance L13 (not shown).

The point C8 is on the line that extends diagonally backward right from the rotational center point 6C of the cab 6, the line forming a predetermined angle (in this example, 45°) with respect to the center line 6CL of the cab 6. The point C8 indicates a position that is shifted outward from the point C9 by a predetermined distance L10.

The point C11 indicates a position that is shifted to the left from the point C2 by a predetermined distance L11. The point C12 indicates a position that is shifted backward from the point C11 by the predetermined distance L7.

The point C14 is, for example, set as a point near the left side surface of the cab 6. The point C14 indicates a position that is shifted to the left from the rotational center point 6C of the cab 6 by the predetermined distance L13 (not shown). The point C13 indicates a position that is shifted to the left from the point C14 by a predetermined distance L12.

It should be noted that the predetermined values ($\lambda$, $\sigma$, and L5 to L13) relating to each cab 6 may be different between the two passenger boarding bridges 1A and 1B depending on, for example, the size of each cab 6.

For the passenger boarding bridge 1A, the line calculator 52 calculates the position coordinates of the end points of the plurality of line segments forming the virtual lines (5Voa and 6Voa), thereby calculating the current existing positions (hereinafter, simply "current positions") of the respective virtual lines. Also, the line calculator 52 calculates the position coordinates of the end points of the plurality of line segments forming the profile lines (5Via and 6Via), thereby calculating the current existing positions (hereinafter, simply "current positions") of the respective profile lines.

Similarly, for the passenger boarding bridge 1B, the line calculator 52 calculates the position coordinates of the end points of the plurality of line segments forming the virtual lines (5Vob and 6Vob), thereby calculating the current positions of the respective virtual lines. Also, the line calculator 52 calculates the position coordinates of the end points of the plurality of line segments forming the profile lines (5Vib and 6Vib), thereby calculating the current positions of the respective profile lines.

It should be noted that each virtual line of one passenger boarding bridge 1A (1B) is formed by a plurality of line segments as described above, and is preset such that, in a plan view, the virtual line is shifted outward from the profile of the one passenger boarding bridge 1A (1B) of its side adjacent to the other passenger boarding bridge 1B (1A), and the shape of the virtual line conforms to the shape of the profile.

Also, each profile line of one passenger boarding bridge 1A (1B) is formed by a plurality of line segments as described above, and is preset such that, in a plan view, the profile line extends along the profile of the one passenger boarding bridge 1A (1B) of its side adjacent to the other passenger boarding bridge 1B (1A), and the shape of the profile line conforms to the shape of the profile.

It should be noted that the end points of the line segments forming the virtual lines and the profile lines of the passenger boarding bridges 1A and 1B are set with respect to the bodies of the passenger boarding bridges 1A and 1B. Therefore, the position coordinates of the end points of the line segments forming the virtual lines and the profile lines of the passenger boarding bridges 1A and 1B can be calculated based on measurement values that determine the orientation of the passenger boarding bridges 1A and 1B in a plan view (i.e., the rotational angles α and β of the respective rotundas 4, which are detected by the respective rotunda angle sensors 21; the rotational angles ω1 and ω2 of the respective cabs 6, which are detected by the respective cab angle sensors 22; and the rotunda center-to-cab center distances LA and LB calculated based on measurement values from the respective tunnel length sensors 23).

As one example, the position coordinates (XAL3, YAL3) of the point AL3 near the tunnel unit 5 of the passenger boarding bridge 1A can be calculated, for example, by equations shown below.

$$YAL3 = LA \times \sin(\alpha-\gamma) + (L1a+L2a) \times \cos(\alpha-\gamma)$$

$$XAL3 = -LA \times \cos(\alpha-\gamma) + (L1a+L2a) \times \sin(\alpha-\gamma)$$

The position coordinates (XAC1, YAC1) of the point C1 (FIG. 5) near the cab 6 of the passenger boarding bridge 1A can be calculated, for example, by equations shown below.

$$YAC1 = LA \times \sin(\alpha-\gamma) + L5a \times \sin\{(\alpha-\gamma)+\omega1+\lambda a\}$$

$$XAC1 = -LA \times \cos(\alpha-\gamma) - L5a \times \cos\{(\alpha-\gamma)+\omega1+\lambda a\}$$

In the above equations, L5a and λa are the values of the predetermined distance L5 and the predetermined angle λ (FIG. 5) for the cab 6 of the passenger boarding bridge 1A.

The position coordinates (XBL3, YBL3) of the point BL3 near the tunnel unit 5 of the passenger boarding bridge 1B can be calculated, for example, by equations shown below.

$$YBL3 = LB \times \sin\beta - (L1b+L2b) \times \cos\beta + Ly$$

$$XBL3 = -LB \times \cos\beta - (L1b+L2b) \times \sin\beta + Lx$$

The position coordinates (XBC1, YBC1) of the point C1 (FIG. 5) near the cab 6 of the passenger boarding bridge 1B can be calculated, for example, by equations shown below.

$$YBC1 = LB \times \sin\beta + L5b \times \sin(\beta+\omega2+\lambda b) + Ly$$

$$XBC1 = -LB \times \cos\beta - L5b \times \cos(\beta+\omega2+\lambda b) + Lx$$

In the above equations, L5b and λb are the values of the predetermined distance L5 and the predetermined angle λ (FIG. 5) for the cab 6 of the passenger boarding bridge 1B.

The position coordinates of the other points can be calculated by suitably using, for example, the rotational angles α and β of the respective rotundas 4, the rotational angles ω1 and ω2 of the respective cabs 6, and the rotunda center-to-cab center distances LA and LB.

Information about the virtual lines and so forth calculated by the line calculator 52 in the above-described manner is inputted to a monitoring controller 53 and a display data generator 54.

The display data generator 54 generates display data for displaying the inputted information about the virtual lines and so forth on a screen of the display device 33. The display data is, for example, transmitted from the monitoring device 51 to the controller 50 of each of the passenger boarding bridges 1A and 1B, and is displayed on the screen of the display device 33 of each of the passenger boarding bridges 1A and 1B.

FIG. 8 shows one example of information about profile lines and virtual lines, the information being displayed on the screen of the display device 33. FIG. 8 shows an example case where the tunnels 5a of the passenger boarding bridges 1A and 1B are provided with the protruding portions Ra and Rb, respectively. In FIG. 8, for the passenger boarding bridge 1A, an area surrounded by the profile lines (5Via and 6Via) and the virtual lines (5Voa and 6Voa) is hatched, and similarly, for the passenger boarding bridge 1B, an area surrounded by the profile lines (5Vib and 6Vib) and the virtual lines (5Vob and 6Vob) is hatched. Here, the profile lines and the virtual lines may be displayed only as the lines, or may be displayed as a combination of the lines and calculation points (such as the points AL1 to AL10, BL1 to BL10, and C1 to C14). Alternatively, only the virtual lines may be displayed.

The monitoring controller 53 uses the information about the virtual lines calculated by the line calculator 52 to determine whether or not the virtual lines (5Voa and 6Voa) of the passenger boarding bridge 1A and the virtual lines (5Vob and 6Vob) of the passenger boarding bridge 1B are in the state of crossing each other based on a predetermined crossing determination condition and to determine whether or not the virtual lines (5Voa and 6Voa) of the passenger boarding bridge 1A and the virtual lines (5Vob and 6Vob) of the passenger boarding bridge 1B are in the state of being close to each other based on a predetermined closeness determination condition.

When the virtual lines of the passenger boarding bridge 1A and the virtual lines of the passenger boarding bridge 1B are in the state of crossing each other, it means that any of the line segments forming the virtual lines of the passenger boarding bridge 1A and any of the line segments forming the virtual lines of the passenger boarding bridge 1B are crossing each other.

Figure 6:
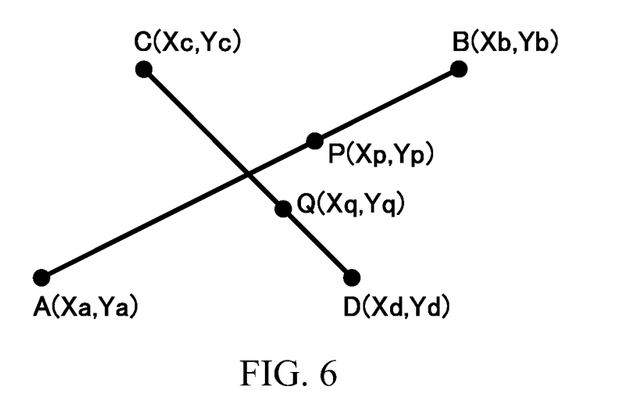
FIG. 6 is a drawing for describing conditions when two line segments cross each other.

FIG. 6 is a drawing for describing conditions when two line segments cross each other. FIG. 6 shows a state where a line segment AB and a line segment CD cross each other. The position coordinates of a point A are (Xa, Ya); the position coordinates of a point B are (Xb, Yb); the position coordinates of a point C are (Xc, Yc); and the position coordinates of a point D are (Xd, Yd). The position coordinates of an arbitrary point P on the line segment AB are (Xp, Yp), and the position coordinates of an arbitrary point Q on the line segment CD are (Xq, Yq). In the description hereinafter, the position vector of the point A is referred to as Av, and similarly, the position vectors of the points B, C, D, P, and Q are referred to as Bv, Cv, Dv, Pv, and Qv, respectively.

Here, the position vector Pv of the point P on the line segment AB, and the position vector Qv of the point Q on the line segment CD, are represented by the following respective equations.

$$Pv = Av + r(Bv - Av) \text{ (parameter } r \text{ is } 0 \leq r \leq 1)$$

$Qv=Cv+s(Dv-Cv)$ (parameter $s$ is $0 \le s \le 1$)

Here, an intersection point between the line segment AB and the line segment CD represents a case where the point P and the point Q are the same. Accordingly, if Pv=Qv, the following equation holds true.

$Av+r(Bv-Av)=Cv+s(Dv-Cv)$

If this equation is expressed by using X, Y coordinates, the following simultaneous equations are obtained.

$Xa+r(Xb-Xa)=Xc+s(Xd-Xc)$ $Ya+r(Yb-Ya)=Yc+s(Yd-Yc)$

Equations shown below for calculating the parameters r and s are obtained from the above simultaneous equations.

$$r = \frac{(Xc-Xd)(Yc-Ya)-(Xc-Xa)(Yc-Yd)}{(Xa-Xb)(Yc-Yd)-(Xc-Xd)(Ya-Yb)}$$ [Math. 1]

$$s = \frac{(Xa-Xb)(Yc-Ya)-(Xc-Xa)(Ya-Yb)}{(Xa-Xb)(Yc-Yd)-(Xc-Xd)(Ya-Yb)}$$

Accordingly, by using the coordinate values of the end points A and B of the line segment AB and the coordinate values of the end points C and D of the line segment CD, the parameters r and s are calculated, and if $0 \le r \le 1$ and $0 \le s \le 1$ hold true at the same time for the calculated parameters r and s, it can be determined that the two line segments are crossing.

The monitoring controller 53 calculates the parameters r and s as above for each of the line segments forming the virtual lines (5Voa and 6Voa) of the passenger boarding bridge 1A and for each of the line segments forming the virtual lines (5Vob and 6Vob) of the passenger boarding bridge 1B, and the crossing determination condition is a condition where $0 \le r \le 1$ and $0 \le s \le 1$ hold true at the same time regarding any of the line segments. If the crossing determination condition is satisfied, it is determined that the virtual lines of the passenger boarding bridge 1A and the virtual lines of the passenger boarding bridge 1B are in the state of crossing each other.

A predetermined value m less than 0 (e.g., m=−0.25) and a predetermined value n greater than 1 (e.g., n=1.25) are preset in the monitoring controller 53. The monitoring controller 53 uses these predetermined values m and n to determine whether or not the closeness determination condition is satisfied. The closeness determination condition being satisfied means that, for any of the line segments forming the virtual lines of the passenger boarding bridge 1A and any of the line segments forming the virtual lines of the passenger boarding bridge 1B, the calculated parameters r and s satisfy either one of conditions (a) and (b) indicated below. If the closeness determination condition is satisfied, it is determined that the virtual lines of the passenger boarding bridge 1A and the virtual lines of the passenger boarding bridge 1B are in the state of being close to each other.

Condition (a): a condition where $m \le r < 0$ or $1 < r \le n$, and $0 \le s \le 1$ Condition (b): a condition where $0 \le r \le 1$, and $m \le s < 0$ or $1 < s \le n$ It should be noted that if it is determined that the virtual lines of the passenger boarding bridge 1A and the virtual lines of the passenger boarding bridge 1B are in the state of being close to each other, it means that no line segments are in the state of crossing each other, i.e., line segments for which both $0 \le r \le 1$ and $0 \le s \le 1$ hold true at the same time do not exist.

Figure 7:
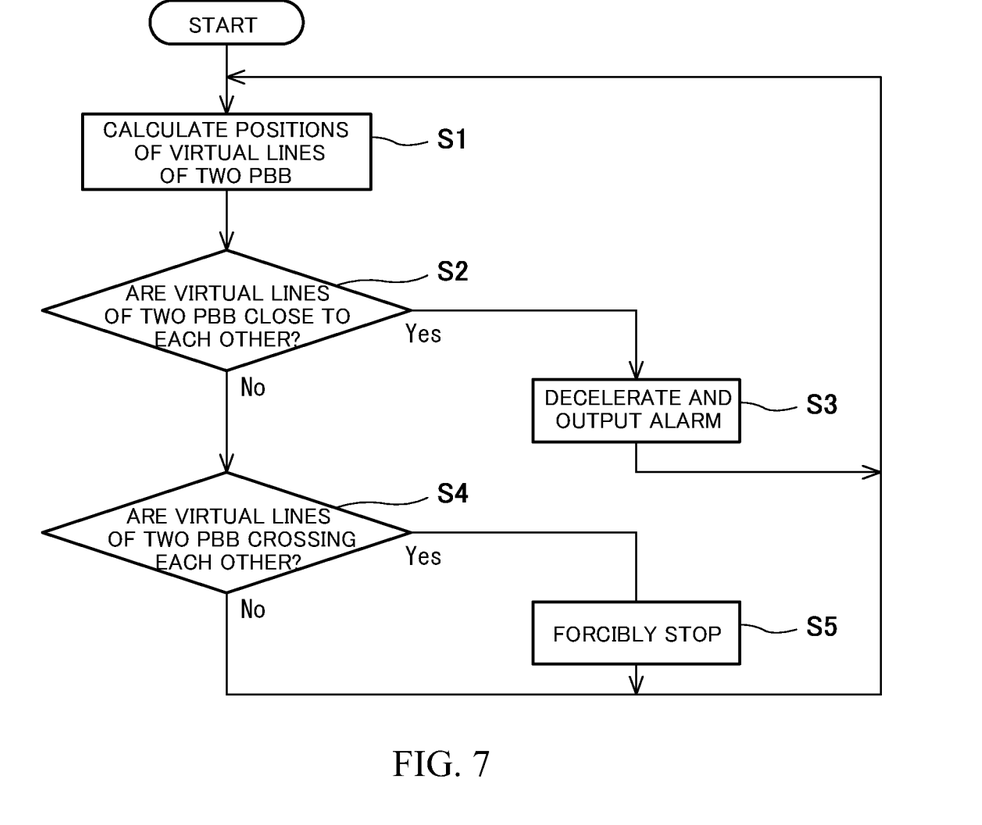
FIG. 7 is a flowchart showing one example of processes performed by the monitoring device.

FIG. 7 is a flowchart showing one example of processes performed by the monitoring device 51. These processes are performed when at least one of the two passenger boarding bridges (PBB) 1A and 1B is in operation. The processes of FIG. 7 are performed, for example, at the time of docking the passenger boarding bridges 1A and 1B with respective entrances of an aircraft and at the time of undocking the passenger boarding bridges 1A and 1B from the respective entrances of the aircraft. It should be noted that the processes of FIG. 7 may be performed only when docking the passenger boarding bridges 1A and 1B with the respective entrances of the aircraft, or only when undocking the passenger boarding bridges 1A and 1B from the respective entrances of the aircraft.

In step S1, the line calculator 52 calculates the current positions of the virtual lines and so forth for the two passenger boarding bridges (PBB) 1A and 1B in the above-described manner. Step S1 is repeated at every predetermined period.

Next, in step S2, the monitoring controller 53 determines in the above-described manner whether or not the virtual lines of the two passenger boarding bridges (PBB) 1A and 1B are in the state of being close to each other. If it is determined "Yes" in step S2, i.e., if it is determined that the virtual lines are in the state of being close to each other, the monitoring controller 53 outputs a deceleration command to decelerate the operating speeds of the passenger boarding bridges 1A and 1B and an alarm command to the controllers 50 of the passenger boarding bridges 1A and 1B (step S3: second coming-close hindering process). In accordance with the deceleration command, each controller 50 decelerates the operating speed of a corresponding one of the passenger boarding bridges 1A and 1B (i.e., decelerates the travel speed of the travel device 9 and the rotation speed of the cab rotator 61), and in accordance with the alarm command, each controller 50 outputs, for example, an alarm from the control board 31 notifying that the passenger boarding bridges are coming close to each other. The alarm may be outputted as an audio alarm from a speaker (not shown) of the control board 31, or may be displayed on the screen of the display device 33.

Next, if it is determined "No" in step S2, the flow proceeds to step S4, in which the monitoring controller 53 determines in the above-described manner whether or not the virtual lines of the two passenger boarding bridges (PBB) 1A and 1B are in the state of crossing each other. If it is determined "Yes" in step S4, i.e., if it is determined that the virtual lines of the two passenger boarding bridges (PBB) 1A and 1B are in the state of crossing each other, the monitoring controller 53 outputs a forcibly stopping command to forcibly stop the passenger boarding bridges 1A and 1B to the controllers 50 of the passenger boarding bridges 1A and 1B (step S5: a first coming-close hindering process). In accordance with the forcibly stopping command, the controllers 50 forcibly stop the respective passenger boarding bridges 1A and 1B from moving toward each other (i.e., each controller 50 forcibly stops the travel device 9 from traveling, and forcibly stops the cab rotator 61 from rotating).

It should be noted that, in step S1, the information about the virtual lines and so forth calculated by the line calculator 52 is inputted to the display data generator 54. Each time the information about the virtual lines and so forth is inputted, the display data generator 54 generates display data for displaying the information on the screen of the display device 33. The display data is transmitted from the monitoring device 51 to the controller 50 of each of the passenger boarding bridges 1A and 1B, and is displayed on the screen of the display device 33 of each of the passenger boarding bridges 1A and 1B, for example, as shown in FIG. 8. As a result, for example, operators can operate the respective passenger boarding bridges 1A and 1B while checking the distance between the two passenger boarding bridges 1A and 1B by looking at the virtual lines of the two passenger boarding bridges 1A and 1B, which are displayed on each display device 33. This makes it possible to prevent the two passenger boarding bridges 1A and 1B from coming abnormally close to each other.

It should be noted that a display device, a speaker, and so forth may be connected to the monitoring device 51, and these may be arranged, for example, at predetermined positions in a central monitoring room or the like. The display device, speaker, and so forth arranged in the central monitoring room or the like may output the alarm in step S3. In this case, the display data generated by the display data generator 54 may be displayed on the screen of the display device, for example, as shown in FIG. 8.

It should be noted that the first coming-close hindering process (step S5 in FIG. 7) and the second coming-close hindering process (step S3 in FIG. 7) are processes for hindering the passenger boarding bridges 1A and 1B from coming close to each other. The first coming-close hindering process is a process for, when the passenger boarding bridges 1A and 1B are currently moving toward each other, forcibly stopping the passenger boarding bridges 1A and 1B from moving toward each other. In the above description, the second coming-close hindering process includes outputting an alarm notifying that the passenger boarding bridges 1A and 1B are coming close to each other. However, this is merely a non-limiting example. It will suffice if the second coming-close hindering process includes, at least, slowing down the operating speeds of the passenger boarding bridges 1A and 1B from the current operating speeds.

The functions of the monitoring device 51 may be partly or entirely performed by the controller 50 of either one of the passenger boarding bridges 1A and 1B.

In the present embodiment, for the passenger boarding bridges 1A and 1B adjacent to each other, it is determined whether or not the virtual lines of one passenger boarding bridge 1A and the virtual lines of the other passenger boarding bridge 1B are in the state of being close to each other. If it is determined that the virtual lines are in the state of being close to each other, the second coming-close hindering process (step S3 in FIG. 7) is performed. Also, it is determined whether or not the virtual lines of the one passenger boarding bridge 1A and the virtual lines of the other passenger boarding bridge 1B are in the state of crossing each other. If it is determined that the virtual lines are in the state of crossing each other, the first coming-close hindering process (step S5 in FIG. 7) is performed. In this manner, the state of the virtual lines of the two passenger boarding bridges 1A and 1B relative to each other is determined, which makes it possible to assuredly detect a state where the passenger boarding bridges 1A and 1B have come close to each other.

It should be noted that, in the present embodiment, the virtual lines are calculated for both of the two passenger boarding bridges 1A and 1B. Then, whether or not the virtual lines are in the state of being close to each other, and whether or not the virtual lines are in the state of crossing each other, are determined. Alternatively, for either one of the passenger boarding bridges, only the inward profile lines may be calculated without calculating the outward virtual lines. Then, whether or not the inward profile lines (virtual lines) of the one passenger boarding bridge and the virtual lines of the other passenger boarding bridge are in the state of being close to each other, and whether or not the inward profile lines (virtual lines) of the one passenger boarding bridge and the virtual lines of the other passenger boarding bridge are in the state of crossing each other, may be determined. In this case, for the one passenger boarding bridge, for example, the display device 33 displays only the profile lines.

The present embodiment gives an example in which the two passenger boarding bridges 1A and 1B are to be monitored. Alternatively, three or more passenger boarding bridges may be monitored.

From the foregoing description, numerous modifications and other embodiments of the present invention are obvious to those skilled in the art. Accordingly, the foregoing description is to be construed as illustrative only, and is provided for the purpose of teaching those skilled in the art the best mode for carrying out the present invention. The structural and/or functional details may be substantially modified without departing from the scope of the present invention.

INDUSTRIAL APPLICABILITY

The present invention is useful, for example, as a passenger boarding bridge monitoring device that is capable of assuredly detecting a state where passenger boarding bridges have come close to each other.

REFERENCE CHARACTERS LIST

1A, 1B passenger boarding bridge
2 terminal building
4 rotunda
5 tunnel unit
6 cab
9 travel device
21 rotunda angle sensor
22 cab angle sensor
23 tunnel length sensor
51 monitoring device
52 line calculator
53 monitoring controller
54 display data generator

The invention claimed is:

1. A passenger boarding bridge monitoring device for, when docking and/or undocking a plurality of passenger boarding bridges with and/or from a plurality of respective entrances of an aircraft, monitoring the plurality of passenger boarding bridges,
   each of the passenger boarding bridges including:
      a rotunda connected to a terminal building and supported such that the rotunda is rotatable horizontally;
      a tunnel unit whose proximal end is connected to the rotunda, the tunnel unit being extendable and retractable;
      a travel device that supports the tunnel unit, the travel device including travel wheels that are drivable to rotate in regular and reverse directions;
      a rotatable cab provided at a distal end of the tunnel unit and mounted to one of the entrances of the aircraft;
      a detector that detects a rotational angle of the rotunda;
      a detector that detects a length of the tunnel unit; and
      a detector that detects a rotational angle of the cab, the passenger boarding bridge monitoring device comprising:
- a line calculator configured to calculate, for one of the passenger boarding bridges that are adjacent to each other, a current position of a virtual line based on detection values of the respective detectors of the one passenger boarding bridge, the virtual line being set such that, in a plan view, the virtual line is shifted outward from a profile of the one passenger boarding bridge of its side adjacent to the other passenger boarding bridge, and is a line having a shape conforming to a shape of the profile, the line calculator being configured to calculate, for the other passenger boarding bridge, a current position of a virtual line based on detection values of the respective detectors of the other passenger boarding bridge, the virtual line being set such that, in a plan view, the virtual line either extends along or is shifted outward from a profile of the other passenger boarding bridge of its side adjacent to the one passenger boarding bridge, and is a line having a shape confirming to a shape of the profile; and
- a monitoring controller configured to determine based on a predetermined crossing determination condition whether or not the virtual line, of the one passenger boarding bridge, whose current position is calculated by the line calculator and the virtual line, of the other passenger boarding bridge, whose current position is calculated by the line calculator are in a state of crossing each other, and if it is determined that the virtual lines are in the state of crossing each other, perform a first coming-close hindering process.

2. The passenger boarding bridge monitoring device according to claim 1, wherein
the monitoring controller is configured to determine based on a predetermined closeness determination condition whether or not the virtual line, of the one passenger boarding bridge, whose current position is calculated by the line calculator and the virtual line, of the other passenger boarding bridge, whose current position is calculated by the line calculator are in a state of being close to each other, and if it is determined that the virtual lines are in the state of being close to each other, perform a second coming-close hindering process.

3. The passenger boarding bridge monitoring device according to claim 1, wherein
each of the passenger boarding bridges includes a display device, and
the passenger boarding bridge monitoring device further comprises a display data generator configured to generate display data for displaying, on the display device, the virtual lines whose current positions are calculated by the line calculator.

4. The passenger boarding bridge monitoring device according to claim 1, wherein
the line calculator is configured to calculate the current position of the virtual line of the one passenger boarding bridge and the current position of the virtual line of the other passenger boarding bridge by using coordinates of a single orthogonal coordinate system in which a predetermined position is set as an origin.

\* \* \* \* \*